S. JOHNSEN.
DUPLEX PISTON RING.
APPLICATION FILED SEPT. 2, 1919.
1,425,017.
Patented Aug. 8, 1922.
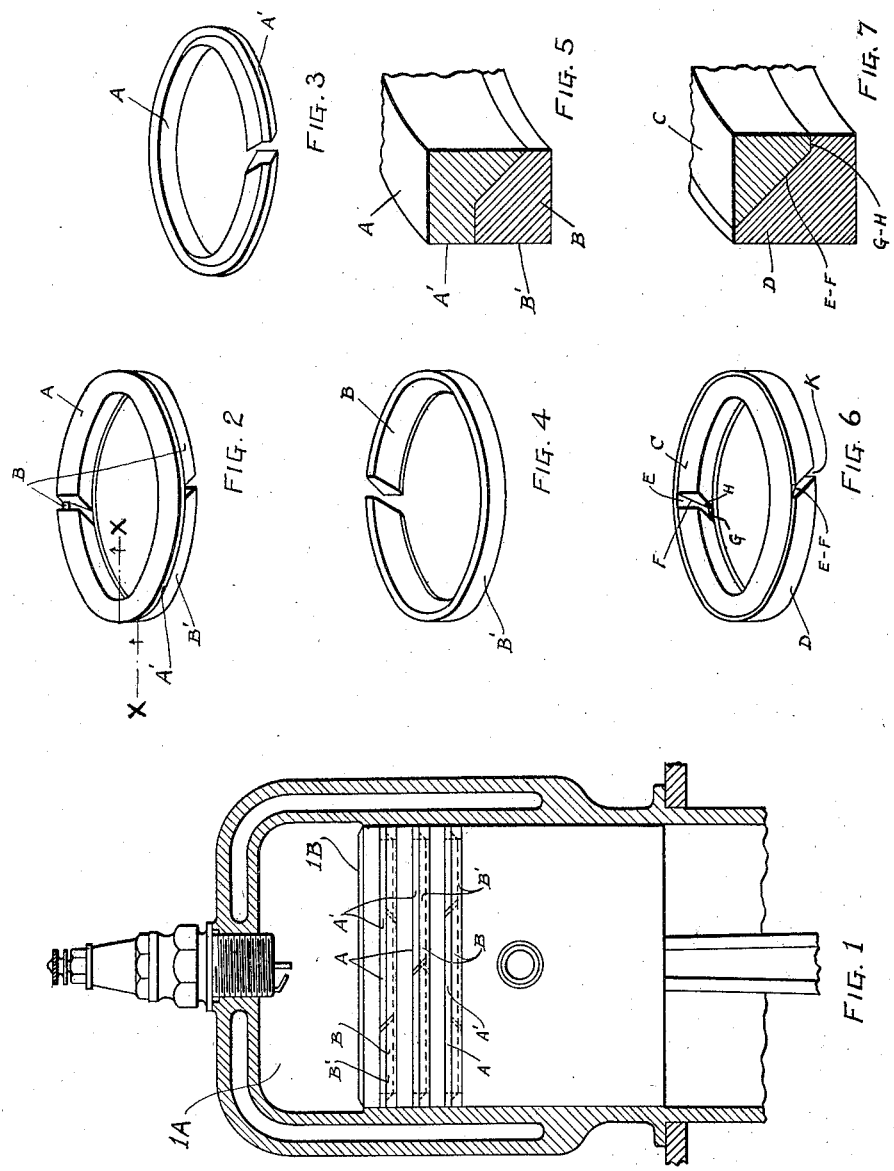

UNITED STATES PATENT OFFICE.

SIGFRED JOHNSEN, OF MENOMINEE, MICHIGAN, ASSIGNOR OF ONE-THIRD TO JAMES A. BELL, OF CLINTONVILLE, WISCONSIN, AND ONE-THIRD TO J. H. VERNET, OF MENOMINEE, MICHIGAN.

DUPLEX PISTON RING.

1,425,017.  Specification of Letters Patent.  Patented Aug. 8, 1922.

Application filed September 2, 1919. Serial No. 321,085.

*To all whom it may concern:*

Be it known that I, SIGFRED JOHNSEN, a citizen of the United States, residing at Menominee, in the county of Menominee and State of Michigan, have invented certain new and useful Improvements in Duplex Piston Rings, of which the following is a specification.

My invention relates to improvements in piston rings of the split ring type and, wherein two rings are employed, one over the other, and in which the two together occupy a space substantially the same as that occupied by a single ring of the old familiar type ring. And the object of my improvement is to provide two rings each having a certain cross section construction, so that, when their adjacent, or co-acting surfaces are placed together in the ring-groove of the piston, as shown in Fig. 1, and also, as shown in Figures 2 and 5, they will both expand to the wall of the cylinder of the engine and at the same time be forced in opposite directions to the sides of the ring-groove with sufficient force to effect substantially a leak-proof joint, thereby preventing any escape of gas beyond the rings, and, which, also eliminates the pumping of oil from the crank case to the compression chamber, and a further object of my improvement is to construct the rings in the manner shown and hereinafter described, so that they will hold the compressed gas in a state of compression for an indefinite period of time.

These and other objects of my improvements will be presented in the accompanying drawings and more fully described in the annexed specification and appended claim.

In the accompanying drawings:—

Fig. 1, illustrates an engine cylinder (in cross section) of the internal combustion type with the piston shown therein in its complete compression stroke, and the crank case broken away; and, upon the piston are shown three sets of rings having embodied therein the improvements of my invention.

Fig. 2, represents, in perspective, a pair, or set, of rings wherein the improvements of my invention are embodied and showing the relative position of the rings as they are to be placed in the ring groove of the piston, (see Fig. 1).

Fig. 3, represents, in perspective, one of a pair, or set, of rings wherein is disclosed the improvements of my invention.

Fig. 4, represents, in perspective, the other of the pair, or set, of rings wherein is disclosed the improvements of my invention.

Fig. 5, is a section on line X—X of Fig. 2, on a larger scale.

Fig. 6, represents, in perspective, a pair of rings of a different type, the explanation of which will follow.

Fig. 7, is a section on line Z—Z of Fig. 6, on a larger scale.

Similar characters refer to similar parts throughout the several views.

In the drawings, $1^A$ represents an engine cylinder within which is located the piston $1^B$. A tight closure between the cylinder $1^A$ and piston $1^B$ is maintained by equipping the piston with a plurality of sets of split packing rings A, B.

Said rings have respectively outer cylindrical surfaces A', B' which contact with the wall of engine cylinder, and as shown in Fig. 5, annular surfaces A'', B'' respectively extend inwardly from the respective cylindrical surfaces A', B' of the rings A, B. From the inner periphery of the surfaces A'', B'', cooperating wedging or conical surfaces A''', B''' extend to the inner cylindrical surface of the respective rings. This arrangement of conical surfaces causes a portion of one ring to lie behind the other ring, and for convenience, this latter ring, or ring B, will be designated as the "outer" ring and the former, or ring A, will be designated as the "inner" ring of the set.

As is customary with the expansible type of split rings, rings A and B are so designed with respect to the diameter of the cylinder in which they are to be used, that they will be radially compressed within the ring groove, when the piston is placed in the cylinder. The inner ring A has greater expansive power than the outer ring B, and this result may be secured, for example, by making ring A larger in cross-section than ring B.

The operation of my improved packing is as follows:

The rings are assembled in the ring groove with ring A towards the piston head and with the openings in the rings A and B out of alignment with each other, and preferably 180° apart as shown in Fig. 2. Due to the resiliency of the rings, they expand to bring surfaces A', B' into contact with the cylinder wall. Due to the greater expansive force of ring A and to its smaller contact surface A', ring A will wear faster than ring B.

But ring A can expand radially more rapidly than ring B only when surface A''' is free to slide along B'''. This condition is realized when the rings are first placed in the groove since for convenience in assembling the groove is made slightly larger than the rings. Ring A therefore wears more rapidly and expands more rapidly than ring B, until its separate outward movement is arrested by the opposed annular faces of A and B contacting with their respective walls of the ring groove. Rings A and B will then wear away, and will expand, at the same rate, the rate of wear being equalized since the inner ring A carries the outer ring B forward. As wear occurs however between the rings and the groove walls, a slipping of surface A''' along B''' is possible, and surface A' again wears away more rapidly than B' thereby allowing ring A to take up the wear.

Surfaces A''', B''' therefore cooperate to keep the opposite sides of the ring in contact with the groove walls. Surfaces A'', B'' operate as "stop" surfaces to prevent "collapse" of the ring under excessive pressure, as is understood in the art.

The construction, while not complicated is efficient in operation due to the fact that both rings bear against the cylinder wall and that the meeting edge of the conical surfaces is located on the inner cylindrical surface of the ring. The advantage of such a construction is readily apparent from a comparison with a ring such as shown in Figs. 6 and 7. This ring comprises an inner ring C and outer ring D which have cooperating conical surfaces E, F, and annular surfaces G, H, respectively. Ring C however does not contact with the cylinder wall and leakage of gas past the split K of outer ring D is thereby possible.

The inner ring C is much smaller in cross-section than ring D, and as the ring D wears away and expands, ring C may reach its limit of expansion before ring D has worn to the limit of its usefulness. When this occurs the packing will fail to function properly since ring C will not contact with the wall of the ring groove.

A more serious objection to this construction results from extending the conical surface E of ring C into contact with the wall of the groove. As the ring wears, a "wire" edge will form at the outer periphery of ring C, and fragments will become detached from the ring, thus obviously resulting in scoring the cylinder walls.

Having thus described my invention, the merits of my improvements can be readily understood, and it will be seen that the minor details of my construction may be altered in many ways without departing from the spirit of my invention, but what I claim and desire to secure by Letters Patent is—

An expansible piston packing comprising an outer split ring and an inner split ring of greater expansive force than said outer ring, both of said rings having inner cylindrical surfaces, an outer cylindrical surface on said outer ring, an outer cylindrical surface on said inner ring and of less area than the outer cylindrical surface of said outer ring, annular surfaces on said rings extending inwardly from the adjacent edges of said outer cylindrical surfaces and cooperating conical surfaces extending from said annular surfaces to the inner cylindrical surface of the respective rings.

SIGFRED JOHNSEN.

Witnesses:
 WM. G. BLORNSTRAN,
 J. CHAS. GUAY.